US005466532A

United States Patent [19]

Wengrovius et al.

[11] Patent Number: 5,466,532
[45] Date of Patent: Nov. 14, 1995

[54] SOLVENTLESS OR HIGH SOLIDS-CONTAINING SILICONE PRESSURE SENSITIVE ADHESIVE COMPOSITIONS

[76] Inventors: Jeffrey H. Wengrovius, 822 Charles St., Schenectady, N.Y. 12302; Timothy B. Burnell, 127 N. College St., Schenectady, N.Y. 12305; Virginia M. Van Valkenburgh, Box 133 Schoolhouse Rd., West Lebanon, N.Y. 12195

[21] Appl. No.: 675,380

[22] Filed: Mar. 26, 1991

[51] Int. Cl.$^6$ ............................................. B32B 27/08
[52] U.S. Cl. ................... 428/447; 528/15; 528/31; 528/32; 525/478
[58] Field of Search ................... 528/31, 32, 15; 525/478; 428/447

[56] References Cited

U.S. PATENT DOCUMENTS

| | | | |
|---|---|---|---|
| 3,983,298 | 9/1976 | Hahn et al. | 428/355 |
| 4,293,671 | 10/1981 | Sasaki et al. | 525/478 |
| 4,774,297 | 9/1988 | Murakami et al. | 525/478 |
| 4,988,779 | 1/1991 | Medford et al. | 525/478 |
| 5,034,061 | 7/1991 | Maguire et al. | 106/287.14 |
| 5,100,976 | 3/1992 | Hamada et al. | 525/477 |

FOREIGN PATENT DOCUMENTS

| | | |
|---|---|---|
| 0269454 | 6/1988 | European Pat. Off. . |
| 035991 | 2/1990 | European Pat. Off. . |

*Primary Examiner*—John C. Bleutge
*Assistant Examiner*—Margaret W. Glass

[57] ABSTRACT

Solventless and high solids-containing silicone pressure sensitive adhesive compositions having high peel adhesion and high tack are provided, comprising (A) a toluene-soluble resinous copolymer containing $R_3SiO_{1/2}$ units and $SiO_{1/2}$ units; (B) a vinyl-terminated polydiorganosiloxane; (C) a hydrogen-terminated polydiorganosiloxane; (D) a hydrosilation catalyst; and (E) from 0 to about 10 percent by weight of an organic solvent; provided that the combined viscosity of (B) and (C) is from about 10 to about 500 centipoises at 25° C., the combined crosslink densities of (B) and (C) is from about 0.3 to about 5.0%, preferably 0.3 to about 2.0%, and the molar ratio of silicon-bonded hydrogen groups in (C) to silicon-bonded alkenyl groups in (B) is in the range of from about 0.8:1 to about 1.5:1 and preferably about 1:1.

34 Claims, No Drawings

SOLVENTLESS OR HIGH SOLIDS-CONTAINING SILICONE PRESSURE SENSITIVE ADHESIVE COMPOSITIONS

CROSS REFERENCE TO RELATED APPLICATIONS

Reference is made to the concurrently filed applications identified as Ser. No. 07/675,232, filed Mar. 26, 1991, now U.S. Pat. No. 5,292,586, and Ser. No. 07/675,396, filed Mar. 26, 1991, now U.S. Pat. No. 5,190,827.

BACKGROUND OF THE INVENTION

The present invention relates to silicone compositions suitable for forming pressure sensitive adhesive compositions. More particularly, the present invention relates to solventless or high solids-containing, addition-curable silicone compositions suitable for forming pressure sensitive adhesive compositions having excellent tack and adhesive properties.

The term "pressure sensitive adhesive" (PSA) as used herein refers to adhesives that can be adhered to a surface and yet can be stripped from the surface without transferring more than trace quantities of adhesive to the surface, and can be readhered to the same or another surface because the adhesive retains some or all of its tack and adhesive strength. Silicone pressure sensitive adhesives have excellent adhesive and cohesive strength and high tack as well as excellent heat resistance, cold resistance, electrical properties, and the like, which makes them applicable for use as electrical-insulating tape and for various pressure-sensitive products which must be resistant to hot and cold.

However, a drawback associated with silicone pressure sensitive adhesives is the use, handling, and emission of flammable and volatile organic compounds, e.g., organic solvents, in the preparation of the pressure sensitive adhesives from compositions containing high levels of organic solvent. Conventional pressure sensitive adhesives are made using high viscosity polymer inputs. Solvent is generally used for the purpose of reducing the viscosity of the composition to a level which renders the curable composition processable. It would be desirable to provide solventless or high solids containing (i.e., low solvent-containing) pressure sensitive adhesive silicone compositions containing low viscosity polymer inputs.

Another drawback associated with conventional pressure sensitive adhesives is their requirement for high cure temperature, e.g., 165° C. and higher, in order to cure effectively. Because such pressure sensitive adhesives require high temperatures to cure, they cannot be used on substrates such as polyolefin-backed substrates which are sensitive to high temperatures.

Addition-curable, low solvent-containing silicone compositions capable of curing to form pressure sensitive adhesive compositons are known in the art.

U.S. Pat. No. 3,983,298 (Hahn et al.) is directed to a silicone composition suitable for use as a pressure sensitive adhesive and obtained by mixing components consisting essentially of (a) 50–60 parts by weight of a solid, benzene-soluble resin copolymer consisting essentially of $R_3SiO_{1/2}$ units and $SiO_{4/2}$ units, which is known as an "MQ" resin, (b) 40–50 parts by weight of a vinyl-terminated polydiorganosiloxane having a viscosity of from 20,000 to 100,000 centipoises at 25° C., (c) a hydrogen-containing organopolysiloxane in an amount sufficient to provide from 1.0 to 20.0 silicon-bonded hydrogen atoms for every olefinically unsaturated radical in the total of (a) plus (b), and (d) a platinum-containing catalyst. It is pointed out in Hahn et al. that compositions of the prior art based on mixtures of a benzene soluble resin copolymer containing $R_3SiO_{1/2}$ units and $SiO_{4/2}$ units (hereinafter sometimes referred to as "MQ resin") and low viscosity silicones do not form pressure sensitive adhesive compositions.

U.S. Pat. No. 4,774,297 (Murakami et al.) is directed to a composition suitable for forming a pressure sensitive adhesive having excellent tack and adhesive strength, comprising (A) 30–70 parts by weight of a vinyl-terminated polydiorganosiloxane having a viscosity of at least 500,000 centipoises at 25° C., (B) 70–30 parts by weight of an organopolysiloxane containing $R_3SiO_{1/2}$ units and $SiO_{4/2}$ units, (C) an organohydrogensiloxane in an amount sufficient to provide 1–20 silicon-bonded hydrogen atoms per alkenyl group, (D) a platinum-containing catalyst, and (E) from 25–400 parts by weight of an organic solvent. The vinyl polymer used in the Murakami et al. composition has a viscosity of at least 500,000 centipoises and preferably at least one million centipoises at 25° C.

European Patent Application No. 0269454 (Murakami et al.) discloses a composition suitable for forming a pressure sensitive adhesive having excellent tack and adhesive strength and comprising an alkenyl group-containing silicone polymer, a tackifying silicone resin, an organohydrogensiloxane, and a platinum-containing catalyst. There is said to be no specific restriction on the molecular weight of the alkenyl group-containing silicone polymer as long as no adverse effect accrues with respect to the workability of the pressure sensitive adhesive composition. If the pressure sensitive adhesive composition is solventless, the viscosity of the alkenyl group-containing silicone polymer is no more than 100,000 centipoises at 25° C., while in a solvent-containing composition, the alkenyl group-containing silicone polymer should have a viscosity of at least one million centipoises at 25° C. The organohydrogenpolysiloxane should be present in an amount sufficient to provide 1 to 40 silicon-bonded hydrogen atoms per alkenyl group in the composition. The Murakami et al. reference does not disclose a pressure sensitive adhesive composition prepared with low viscosity vinyl-functional silicones.

U.S. Pat. No. 4,988,779 (Medford et al.) discloses a composition having a solvent content of no more than 5–10% by weight and suitable for forming a pressure sensitive adhesive, wherein the composition comprises from 30 to 50 parts of a vinyl endblocked polydiorganosiloxane fluid having a viscosity of from 500 to 10,000 centipoises at 25° C., from 50 to 70 parts of a benzene soluble resin copolymer containing $R_3SiO_{1/2}$ units and $SiO_{4/2}$ units, an organopolysiloxane having silicon bonded hydrogen atoms, and a platinum catalyst. The hydrogen-containing organopolysiloxane is present in an amount sufficient to provide from 1.0 to 30.0 silicon bonded hydrogen atoms for every olefinically unsaturated radical in the composition.

European Patent Application No. 0355991 (Boardman) is directed to a pressure sensitive adhesive composition having a high solids content, i.e., typically in excess of 95% by weight, preferably in excess of 98% by weight, comprising (a) an MQ resin containing silicon-bonded hydroxyl radicals ranging from 1 to 4 percent by weight of the copolymer, (b) an alkenyl-terminated polydiorganosiloxane, (c) a hydrogen-terminated polydiorganosiloxane, (d) a crosslinking agent, and (e) a hydrosilation catalyst. The number of repeating units in the alkenyl-terminated polydiorganosiloxane and the hydrogen-terminated polydiorganosiloxane ranges from 0 to 1000 in each. The crosslinking agent is an organosiloxane containing more than two groups that will condense with a hydrogen or alkenyl group of an organopolysiloxane in a hydrosilation reaction. The ratio of the total number of silicon-bonded alkenyl groups present in (d) and (b) to the total number of silicon-bonded hydrogen atoms present in (d) and (c) ranges from 0.8 to 1.2, i.e., the ratio of the total number of silicon-bonded hydrogen atoms in (d) and (c) to the total number of silicon-bonded alkenyl groups in (d) and (b) ranges from 0.83–1.25:1. The results reported in the examples show that the tack obtained therein ranged from low to moderate. The Boardman composition contains an external crosslinking agent, the examples therein using 1,3,5,7-tetravinyl-tetramethylcyclotetrasiloxane as the crosslinker. It is desirable to provide a solventless or high solids-containing addition-curable pressure sensitive adhesive composition which does not require the presence of an external crosslinker.

It is further desirable to provide solventless or high solids-containing pressure sensitive adhesive compositions containing polymer inputs having viscosities lower than those taught in the prior art. It is also desirable to provide solventless or high solids containing pressure sensitive adhesive compositions which cure to form pressure sensitive adhesives having high tack values as well as high peel adhesion values. It is further desirable to provide solventless or high solids content, addition-curable silicone pressure sensitive adhesive compositions which can be cured effectively at relatively low temperatures to form pressure sensitive adhesives having high tack and peel adhesion values.

Such silicone pressure sensitive adhesive compositions are provided by the present invention.

SUMMARY OF THE INVENTION

The present invention is directed to a solventless or low solvent-containing organopolysiloxane composition curable to produce a pressure sensitive adhesive having high tack and high peel adhesion properties, comprising by weight:

(A) from about 50 to about 75 parts by weight of a toluene soluble, resinous copolymer comprising $R_3SiO_{1/2}$ units and $SiO_{4/2}$ units wherein R is a monovalent hydrocarbon radical having from 1 to about 6 carbon atoms, the resinous copolymer comprising from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{1/2}$ units to $SiO_{4/2}$ units being from about 0.6 to about 0.9 inclusive;

(B) an alkenyl-terminated polydiorganosiloxane having the general formula

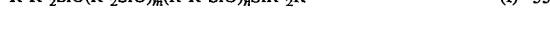  (I)

wherein each $R^1$ is independently an alkyl group having from 1 to about 10 carbon atoms or an aryl group, $R^2$ is an alkenyl group having from 1 to about 10 carbon atoms, "m" and "n" are numbers such that the sum of "m"+"n" is equal to a number in the range of from about 1 to about 300;

(C) an organohydrogenpolysiloxane compatible with the mixture of (A) and (B) and having the general formula

  (II)

wherein each $R^3$ is independently an alkyl group having from 1 to about 10 carbon atoms or an aryl group, "a" and "b" each are numbers such that the sum of "a"+"b" is a number in the range of from 1 to about 300, there being greater than two silicon bonded hydrogen atoms per molecule of (C), no silicon atom bearing more than one silicon bonded hydrogen atom; the total of (B) and (C) being from about 25 to about 50 parts by weight; the total of (A), (B), and (C) being 100 pans by weight; the molar ratio of silicon-bonded hydrogen groups in (C) to silicon-bonded alkenyl groups in (B) being in the range of from about 0.8:1 to about 1.5:1; with the proviso that the total crosslink density of (B) and (C) is from about 0.3 to about 5.0%, and with the further proviso that the combined viscosities of (B) and (C) are from about 10 to about 500 centipoises at 25° C.;

(D) a catalytic amount of a hydrosilation catalyst; and (E) from 0 to about 10% by weight of an organic solvent, The compositions of the present invention cure at a relatively low temperature, i.e., from about 120° C. to about 140° C., to form pressure sensitive adhesives having a tack of greater than 200 grams/cm², preferably greater than 700 grams/cm²; a peel adhesion strength greater than 20 ounces/inch, preferably greater than 25 ounces/inch. Furthermore, the compositions of this invention require no solvent to improve workability in the uncured state.

DETAILED DESCRIPTION OF THE INVENTION

The term "crosslink density" as used herein refers to the value obtained by dividing the total number of moles of internal silicon-bonded hydrogen groups in (C) having the general formula (II) and/or internal silicon-bonded alkenyl groups in (B) having the general formul (I) by the total number of moles of internal silicon atoms in (C) having the general formula (II) and (B) having the general formula (I). The term "internal" refers to those groups bonded to non-terminal silicon atoms in the silicone chain. The "internal silicon atoms" are the non-terminal silicon atoms. As will be discussed in greater detail below, the crosslink density of the curable composition of this invention is critical to obtaining the superior peel adhesion and tack properties of the final pressure sensitive adhesive prepared from the low viscosity polymer inputs used in the present invention.

Component (A) of the composition of the present invention is a toluene-soluble, resinous organopolysiloxane copolymer which imparts tack to the cured pressure sensitive adhesive prepared from the composition. The resinous copolymer (A) comprises $R_3SiO_{1/2}$ units and $SiO_{4/2}$ units wherein R is a monovalent hydrocarbon radical containing from 1 to about 6 carbon atoms. At least 95% of all R groups are alkyl groups, preferably methyl. The total number of R radicals that have olefinic unsaturation is no more than 0.5%, and preferably is zero %, of all R radicals. The molar ratio of $R_3SiO_{1/2}$ units to $SiO_{4/2}$ units is from about 0.6 to about 0.9 inclusive. The resinous copolymer comprises from about 0.2% to about 5.0% and preferably from about 1.0% to about 3.0%, by weight based on the total weight of the copolymer, of hydroxyl radicals.

Component (A) is present in the composition of this invention in an amount ranging from about 50 to about 75, preferably from about 50 to about 70, and most preferably from about 55 to about 62, parts by weight.

Methods for making the resinous copolymer (A) are known in the art. Reference is made, for example, to U.S.

Pat. No. 2,676,182 to Daudt et al., which is hereby incorporated by reference herein. In the Daudt et al. method, a silica hydrosol is reacted under acidic conditions with a source of triorganosiloxy units such as a hexaorganodisiloxane, e.g., hexamethyldisiloxane, or a hydrolyzable triorganosilane, e.g., trimethylchlorosilane, or mixtures thereof, and recovering a benzene soluble resin copolymer having M and Q units.

The resinous copolymer (A) is a solid, resinous material and is most often available as a solution in a solvent such as xylene or toluene, generally as a 40% to 60% by weight solution. For ease of handling of the composition of the present invention, one part of the solution of the resinous copolymer is usually dissolved in some or all of the vinyl chain-stopped polysiloxane (B) and the other part of the solution of the resinous copolymer is usually dissolved in some or all of the hydride chain-stopped polysiloxane (C) and the solvent stripped from each of the resulting solutions to produce solutions of resinous copolymer (A) in the vinyl-chainstopped polysiloxane (B) and in the hydride-chainstopped polysiloxane (C). The solution of (A) and (B) typically contains from about 50 to about 75, preferably from about 50 to about 70, and most preferably from about 55 to about 62, parts by weight, of (A), and from about 25 to about 50, preferably from about 30 to about 50, and most preferably from about 38 to about 45 parts by weight, of (B). The solution of (A) and (C) typically contains from about 50 to about 75, preferably from about 50 to about 70, and most preferably from about 55 to about 62, parts by weight, of (A), and from about 25 to about 50, preferably from about 30 to about 50, and most preferably from about 38 to about 45 parts by weight, of (C).

Component (B) of the composition of the present invention is an alkenyl-terminated polydiorganosiloxane having the general formula

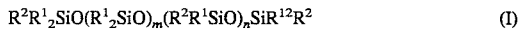

$$R^2R^1{}_2SiO(R^1{}_2SiO)_m(R^2R^1SiO)_nSiR^{12}R^2 \quad (I)$$

wherein each $R^1$ is independently an alkyl group having from 1 to about 10 carbon atoms or an aryl group, $R^2$ is an alkenyl group having from 1 to about 10 carbon atoms, "m" and "n" are each numbers such that the sum of "m"+"n" is equal to a number in the range of from about 1 to about 300.

In formula (I), $R^1$ is an alkyl group such as methyl, ethyl, and propyl, or an aryl group such as phenyl. Preferably, at least 99.5 percent and most preferably 100 percent of all $R^1$ radicals are alkyl and most preferably methyl. $R^2$ is an alkenyl group such as vinyl, allyl, or propenyl. Preferably, $R^2$ is vinyl. The polysiloxane (B) must be terminated with silicon-bonded alkenyl groups so that polymer chain extension with the terminal hydride groups on (C) will occur during cure.

In formula (I) above, the sum of "m"+"n" is preferably a number ranging from about 10 to about 100, and most preferably from about 15 to about 25.

Alkenyl-terminated polydiorganosiloxanes (B) can be prepared by any of the conventional methods for preparing triorganosiloxane-terminated polydiorganosiloxanes. For example, a proper ratio of the appropriate hydrolyzable silanes, e.g., vinyldimethylchlorosilane and dimethyldichlorosilane, may be cohydrolyzed and condensed or alternately an appropriate 1,3-divinyltetraorganodisiloxane, e.g., symmetrical divinyldimethyldiphenyldisiloxane or divinyltetramethyldisiloxane, which furnishes the endgroups of the polydiorganosiloxane, may be equilibrated with an appropriate diorganopolysiloxane, e.g., octamethylcyclotetrasiloxane, in the presence of an acidic or basic catalyst. Regardless of the method of preparation of polydiorganosiloxane (B), there is usually coproduced a varying quantity of volatile, cyclic polydiorganosiloxanes. Volatile cyclic polydiorganosiloxanes, e.g., methyl tetramer, should be removed, since they are volatile and adversely affect pressure sensitive adhesive properties.

The amount used of polydiorganosiloxane (B), its formula (presented hereinabove as formula (I)), and its viscosity, for the purposes of this invention, refers to the essentially cyclic free portion of the polydiorganosiloxane. This essentially cyclic free portion can be determined by heating a sample of the polydiorganosiloxane at 150° C. for up to 1 hour to yield a residue. This residue will be essentially free of cyclic material with the exception of trace quantities of macrocyclic polydiorganosiloxanes which are non-volatile at 150° C. and atmospheric pressure.

Many of these polydiorganosiloxanes (B) are commercially available. Furthermore, component (B) can be homopolymers or copolymers or their several mixtures as long as they are alkenyl-endblocked polydiorganosiloxanes of formula (I).

Component (C) is an organohydrogenpolysiloxane compatible with the mixture of (A) and (B) and having the general formula

$$R^3{}_2HSiO(R^3HSiO)_a(R^3{}_2SiO)_bSiHR^3{}_2 \quad (II)$$

wherein each $R^3$ is independently an alkyl group having from 1 to about 10 carbon atoms or an aryl group, the sum of "a"+"b" being in the range of from 1 to about 300, there being greater than two silicon bonded hydrogen atoms per molecule of (C), no silicon atom bearing more than one silicon bonded hydrogen atom; the total of (B) and (C) being from about 25 to about 50 parts by weight; the total of (A), (B), and (C) being 100 parts by weight; the molar ratio of silicon-bonded hydrogen groups in (C) to silicon-bonded alkenyl groups in (B) being in the range of from about 0.8:1 to about 1.5:1; with the proviso that the total crosslink density of (B) and (C) is from about 0.3 to about 5.0%, and with the further proviso that the combined viscosities of (B) and (C) are from about 10 to about 300 centipoises at 25° C.

The term "compatible" means that the required amount of organohydrogenpolysiloxane (C) is at least partially soluble in the mixture of (A) and (B) and will exist in a uniformly dispersed state in the composition of this invention while participating in the curing reaction, until the cure has been effected.

Examples of alkyl groups represented by $R^3$ in formula (II) above include methyl, ethyl, and propyl. An example of an aryl group represented by $R^3$ is phenyl. Preferably, at least 99.5 percent and most preferably 100 percent of all $R^3$ radicals are alkyl and most preferably methyl.

The total amount of (B) and (C) is from about 25 to about 50, preferably from about 30 to about 50, and most preferably from about 38 to about 45, parts by weight.

The total crosslink density of (B) and (C) is from about 0.3 to about 5.0%, preferably from about 0.3 to about 2.0%, and most preferably from about 0.60 to about 1.2%. The internal silicon-bonded hydrogen groups in (C) and the silicon-bonded alkenyl groups in (B) function as crosslink sites and provide the necessary strength to the cured pressure sensitive adhesive.

The total crosslink density of (B) and (C) is critical to the present invention because if the crosslink density is too low, the cured pressure sensitive adhesive fails cohesively due to inadequate curing and leaves a residue on the substrate. If the crosslink density is too high, the cured pressure sensitive adhesive exhibits low tack and low adhesion peel values.

The molar ratio of silicon-bonded hydrogen groups in (C) to silicon-bonded alkenyl groups in (B) is in the range of from about 0.8:1 to about 1.5:1; preferably from about 0.9:1 to about 1.3:1, and most preferably about 1:1.

It is critical to the present invention that the molar ratio of silicon-bonded hydrogen groups (i.e., sometimes referred to herein as "SiH") in (C) to silicon-bonded alkenyl groups (i.e., sometimes referred to herein as "SiVi" or "SiVinyl") in (B) be in the ranges recited above. Maintaining an SiH:SiVi ratio within these limits ensures that a high molecular weight silicone network is formed during cure and ensures maximum tack values and thermal stability of the cured pressure sensitive adhesive by eliminating residual SiH groups that can react with MQ resin, which cause the physical properties to change over time.

The amount of (C) sufficient to fulfill these ratio requirements is determined by measuring the alkenyl or vinyl contents of the desired types and amounts of components (A) and (B), which is typically done by $^{29}$Silicone NMR. A precise amount of (C) can be used to provide a specific ratio of SiH to SiVinyl.

It is to be understood by those skilled in the art that the SiH:SiVinyl molar ratio and crosslink density used in this invention are to be chosen such that the higher the SiH:SiVinyl molar ratio used, the higher the crosslink density used, and the lower the SiH:SiVinyl molar ratio used, the lower the crosslink density used. The proper combination of SiH:SiVinyl ratio and crosslink density can be determined by experimentation. It has been found that at a SiH:SiVinyl molar ratio of about 1:1, the crosslink density which should be used to obtain good pressure sensitive adhesive properties ranges from about 0.3 to about 2.0%, preferably from about 0.4 to about 1.5%, and most preferably 0.60 to about 1.2%.

The hydride polysiloxane (C) must be terminated with hydride groups so that polymer chain extension with the terminal vinyl groups on (B) will occur during cure.

The combined viscosity of (B) and (C) is from about 10 to about 500, preferably from about 10 to about 200, and most preferably from about 15 to about 25, centipoises at 25° C. The combined viscosity of (B) and (C) must be 500 centipoises or less at 25° C. because low viscosities are necessary to ensure that solventless mixtures of MQ resins with (B) and (C) are pourable.

Organohydrogenpolysiloxanes and their preparation are well known in the organosilicon polymer art; some are commercially available. Briefly, the preparation of organohydrogensiloxanes can be accomplished in any suitable manner such as by hydrolyzing silanes, such as chlorosilanes, and equilibrating the resulting hydrolyzate under acid catalysis. Alternately, a mixture of suitable siloxanes, such as cyclic siloxanes and linear siloxanes, can be copolymerized and equilibrated under acid catalysis. For example, a hydride-stopped silicone fluid suitable for use in the present invention can be prepared by reacting tetramethyldisiloxane with cyclic methyl tetramer of predetermined ratio in the presence of Filtrol-20 as catalyst for 4–6 hours at 80°–100° C. The Filtrol-20 catalyst is then removed by filtration and the residual reactants are removed by vacuum stripping.

Component (D) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention are disclosed, for example, in U.S. Pat. Nos. 3,159,601 and 3,159,662 (Ashby); 3,220,970 (Lamoreaux); 3,814,730 (Karstedt); 3,516,946 (Modic), and 4,029,629 (Jeram); all of the foregoing patents being hereby incorporated by reference herein.

Preferably, the hydrosilation catalyst used in the present invention is a platinum-containing catalyst. Suitable platinum-containing hydrosilation catalysts include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

Other suitable platinum-containing hydrosilation catalysts for use in the present invention include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the U.S. Pat. Nos. cited in the instant paragraph are incorporated by reference into the present disclosure.

Catalysts which are soluble in the mixture of (A), (B) and (C) are preferred, particularly if optical clarity is desired.

The platinum-containing catalyst (D) is present in the composition of this invention in an amount sufficient to provide at least 0.1 part by weight platinum for one million parts by weight of the combined weight of (A), (B), and (C). Frequently, such small amounts of catalyst are poisoned by trace amounts of impurities in the composition so it is advantageous to use the platinum catalyst in such quantities to provide at least 1.0 part per million (ppm). The amount of platinum-containing catalyst is not critical with respect to the upper limit but its cost would suggest that excessive quantites be avoided. Amounts of up to 200 ppm platinum are not unusual but preferably from 1 to 35 parts by weight of platinum for every one million parts by weight of the total of (A), (B), and (C) used.

The compositions of the present invention can further compose up to about 10 percent by weight of an organic solvent. Suitable organic solvents include any of the solvents conventionally used with organosiloxanes and having a boiling point below approximately 250° C., such as aromatic hydrocarbons, e.g., benzene, toluene, and xylene; aliphatic hydrocarbons such as hexane, heptane, and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers, e.g., tetrahydrofuran and the dimethylether of ethylene glycol; ketones such as methyl isobutyl ketone and esters such as ethyl acetate and the like. Mixtures of organic solvents can also be used.

The components of the compositions of this invention can be mixed in any manner such as in bulk or in organic solvent. Since the resinous copolymer (A) is a solid and is conveniently prepared and handled in an organic solvent, the preparation of the composition of this invention preferably uses an organic solvent, at least for the mixing of (A) and (B). The organic solvent can be any of the solvents recited above in connection with component (E). The mixing of the components can be accomplished by any of the techniques known in the art, such as milling, blending, stirring, and the like, either in batch or in continuous process.

The composition of this invention can be prepared, with or without the aid of solvent, by simply mixing (A), (B), (C), and (D) together in the stated proportions. The order of mixing of the components is not critical, except that the organopolysiloxane (C) and the catalyst (D) are preferably brought together last. If heat is used in the preparation of the compositions of this invention, it is preferred to add the organopolysiloxane (C) after all heating operations in the preparation process have been completed. The preceding system is referred to herein as a one-component system. However, the best method of preparing the composition of this invention is based on a two-component system, wherein two blends are used, one comprising the resinous copolymer (A), which may be dissolved in about an equal weight of an organic solvent to facilitate mixing, with polydiorganosiloxane (B) and the other blend comprising the resinous copolymer, which also may be dissolved in about an equal weight of an organic solvent to facilitate mixing, with polydiorganosiloxane (C), so as to form premade intermediates. This method is preferred because it faciliates control of the SiH/SiVinyl ratio. To obtain compositions having at least 90% and preferably about 100% solids, the copolymer/polydiorganosiloxane blends should be devolatilized under conditions equivalent to heating for 1 hour at 150° C. at atmospheric pressure in order to obtain optimum pressure sensitive adhesive properties. Obviously, excessively high temperatures should be avoided when components (A) and (B) or their mixtures are being devolatilized. A temperature of 100° C., and preferably 80° C., should not be exceeded. The mixture of (A), (B) and solvent is devolatilized in thin film at 70° C. at full vacuum. Additional solvent may be added to the cooled, devolatilized mixtures to obtain a desired viscosity. Catalyst (D) is added to the devolatilized mixture of (A) and (B) to complete the composition of the first component of the two-component system. The second mixture is prepared by blending (A), (C), and solvent and then devolatilizing the blend under vacuum at a temperature of 70° C. A small amount of addition-cure inhibitor and additional solvent may also be added to the cooled, devolatilized mixture of (A) and (C) or (A) and (B) to obtain a desired viscosity. The final composition is completed by mixing the two components in appropriate amounts.

Thus, in a preferred embodiment of the composition of the present invention, the composition comprises by weight:

(1) a solventless mixture comprising by weight from about 55 to about 62 parts by weight of (A) and from about 38 to about 45 parts by weight of (B);

(2) a solventless mixture comprising by weight from about 55 to about 62 parts by weight of (A) and from about 38 to about 45 parts by weight of (C); and (3) a hydrosilation catalyst.

Small amounts of additional ingredients may be added to the composition of this invention if desired. For example, antioxidants, pigments, stabilizers, fillers, and the like, may be added as long as they do not materially reduce the pressure sensitive adhesive properties of these compositions. Volatile additives are preferably added after any solvent removal operations have been completed.

A long or longer "shelf life" can be obtained by mixing a platinum catalyst inhibitor in either of the two components of a two-component system or in the curable mixture in the case of a one component system. Platinum catalyst inhibitors which are useful in the composition of this invention and which display varying lengths of cure time inhibition in our compositions are those described in U.S. Pat. Nos. 3,188,299; 3,188,300; 3,192,181; 3,344,111; 3,383,356; 3,445,420; 3,453,233; 3,453,234; and 3,532,649, and others which might be known in the art. All of the patents cited in the instant paragraph are incorporated by reference herein. Concrete examples of inhibitors which can be used in the composition of the present invention include the ene-ynes, such as 3-methyl-3-pentene-1-yne and 3,5-dimethyl-3-hexene-1-yne; the alkynyl alcohols, such as 3-methyl-1-butyne-3-ol; 3,5-dimethyl-1-hexyne-3-ol; 3-methyl-1-pentyne-3-ol and phenylbutynol; the unsaturated ester, such as alkyl and substituted alkyl maleates; and polymethylvinylcyclosiloxanes.

The effectiveness of a platinum catalyst inhibitor depends on many factors such as its chemical composition, its physical properties, its concentration, and the like. For the purposes of this invention, an effective amount of any particular platinum catalyst inhibitor can be determined by routine experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the composition of this invention at least simultaneously with, and preferably prior to the mixing of components (C) and (D) or parts containing them.

The compositions of this invention, when containing a platinum catalyst inhibitor, can be cured by removing the inhibitor, for example, by evaporation at room temperature or higher or by deactivating the inhibitor by heating at a high temperature, e.g., 100° C. Curing is accomplished by heating the composition to a temperature of from 120° C. to 140° C., preferably about 130° C. Curing time is dependent on the SiH/SiVinyl molar ratio, the thickness of the pressure sensitive adhesive, and the catalyst and inhibitor levels. Generally, at temperatures of 120° C.–140° C., a SiH/SiVinyl molar ratio of about 1.0:1, a PSA thickness of 1–4 mils, a platinum level of 25 ppm and an inhibitor level of 0.75% by weight of dimethylmaleate inhibitor, cure time is about 2 minutes. The exceptional pressure sensitive adhesive characteristics of these compositions are developed when the composition is cured and the cured composition is essentially free of organic solvent.

Preferably, the uncured composition of this invention should be used within a few hours after being prepared, although this time interval from preparation to use, otherwise known as "shelf life", can be extended to several days by cooling the mixture to a temperature of –20° C. or below. Equally long or longer "shelf life" can be realized by mixing a platinum catalyst inhibitor such as any of those described previously herein in either or both of the components of a two-component system is used or in the curable mixture in the case of a one-component system.

The uncured composition of this invention can be used as a solution in one or more of the organic solvents described above or the composition can be used with no solvent present. While it is possible to use as much as 10 percent and more of an organic solvent, typically no more than 1 percent, preferably no more than 0.5 percent and frequently as little as about 0 percent by weight, based on the total weight of the composition, of one or more of the organic solvents described above is used to aid in the application of the composition. This can be accomplished simply by not removing all of the solvent that is used in the preparation of the composition. Alternately, all of the solvent that is used in the preparation of the composition can be removed and the desired amount of the same or another solvent can be added. If, during the preparation of the composition of this invention, any portion of the solvent is removed, particularly if heat and/or vacuum is used to remove the solvent, it is preferred to remove the solvent prior to the addition of other volatile components such as inhibitors or additives. The removal of solvent can be accomplished by any of the known techniques such as entrainment in a stream of inert gas, evaporation, distillation, thin film stripping, and the like, and at any combination of temperature and pressure where the temperature is not allowed to exceed approximately 200° C., preferably about 150° C.

The compositions of this invention are useful as pressure sensitive adhesives and will readily stick to a solid support, whether flexible or rigid. The composition is simply applied to the surface of the support by any suitable coating means such as rolling, spreading, spraying, and the like; and cured as described above. It should be understood that the use of the compositions of this invention encompasses not only the application of the completed, uncured composition on the surface. For example, it is within the scope of this invention to apply a layer of a mixture of (A), (B), and (C) to a solid support and then add the hydrosilation catalyst (D), the needed mixing being accomplished by diffusion of (D) into the layer of (A), (B), and (C). It is preferred to delay the curing reaction until (D) is thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material such as metals, e.g., aluminum, silver, copper, iron, and their alloys; porous materials such as paper, wood, leather, and fabrics; organic polymeric materials such as polyolefins, e.g., polyethylene and polypropylene; fluorocarbon polymers such as polytetrafluoroethylene and polyvinylfluoride, silicone elastomers, silicone resins, polystyrene; polyamides, such as Nylon® polyamides, polyimides, polyesters, and acrylic polymers; painted surfaces; siliceous materials such as concrete, backs, cinderblocks, and glass, e.g., glass cloth and the like. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because the compositions possess the desirable combination of high tack and good adhesive strength.

Useful articles which can be prepared with the PSAs of this invention include pressure sensitive adhesive tapes, labels, emblems, and other decorative or informative signs, and the like. An especially useful article is one comprising a support, flexible or rigid, that can withstand extreme temperatures, hot and/or cold, and carrying on at least one surface thereof, the polyorganosiloxane PSAs of this invention. Such an article makes full use of the stability at high temperatures and the flexibility at low temperatures that the PSAs of this invention possess.

A preferred article is a pressure sensitive adhesive tape comprising an impregnated glass cloth, a polyester polymer, a polyimide polymer, or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

Experimental

In the examples below, the term "MQ resin" refers to 60% by weight solution in toluene of a silicone resin containing $(CH_3)_3SiO_{1/2}$ ("M") units, and $SiO_{4/2}$ ("Q") units and having a silanol content of about 1 to 3% by weight. The term "$D_4$" refers to octamethylcyclotetrasiloxane and "$D_4^{Vi}$" refers to 1,3,5,7-tetravinyl-tetramethylcyclotetrasiloxane. The platinum catalyst used in Examples 8–14 is the Karstedt catalyst, i.e., a solution of 5.2% platinum metal in xylene and 1,3-divinyltetramethyldisiloxane, which is disclosed in U.S. Pat. No. 3,814,730.

EXAMPLES 1–7

Preparation of Intermediates

Seven vinyl-containing silicone fluids were synthesized having the general formula

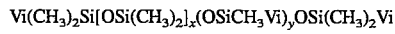

$Vi(CH_3)_2Si[OSi(CH_3)_2]_x(OSiCH_3Vi)_yOSi(CH_3)_2Vi$ wherein Vi represents vinyl, and x, y, and the molecular weight in grams/mole are summarized in Table 1 below.

TABLE 1

| Example No. | x | y | Molecular Weight (g/mol) |
|---|---|---|---|
| 1 | 23.5 | 0.13 | 1940 |
| 2 | 21.5 | 0.28 | 1800 |
| 3 | 19.4 | 0.53 | 1670 |
| 4 | 20.0 | 1.42 | 1790 |
| 5 | 17.0 | 2.3 | 1650 |
| 6 | 10.1 | 9.5 | 1750 |
| 7 | 0 | 18.2 | 1790 |

The viscosities of the fluids prepared in Examples 1–7 were measured to be in the range of about 15–25 centipoises at 25° C.

The fluids used in Examples 1–7 were prepared as follows.

A vinyl-containing fluid having the formula $Vi(CH_3)_2SiOSi(CH_3)_2Vi$ was reacted with appropriate molar equivalents of $D_4$ and $D_4^{Vi}$ in the presence of 0.1 mole % triflic acid. After stirring the neat reaction for 6 days, MgO was added to neutralize the acid. The mixture was filtered and the volatiles were removed by vacuum distillation. The resulting vinyl-terminated silicone fluids were characterized by Brookfield viscosity measurements and $^{29}Si$ NMR to accurately determine molecular weight.

The silicone fluids prepared above were then individually mixed with MQ resin, and the toluene was stripped to provide solventless mixtures containing 60% MQ resin and 40% vinyl-containing silicone fluid ("SiVinyl fluid").

Solventless MQ resin/hydride-containing silicone fluid mixtures were also prepared. A hydride-containing silicone fluid ("Sill fluid") was prepared having the general formula

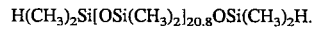

$H(CH_3)_2Si[OSi(CH_3)_2]_{20.8}OSi(CH_3)_2H$.

The Sill fluid had a molecular weight of 1680 grams/mole and a viscosity of about 16 centipoises at 25° C.

The SiH fluid was prepared as follows.

A hydrogen-containing fluid having the formula $H(CH_3)_2SiOSi(CH_3)_2H$ was reacted with an appropriate number molar equivalents of $D_4$ in the presence of 0.1 tool% triflic acid. After stirring the neat reaction for 12 hours, MgO was added to neutralize the acid. The mixture was filtered and the volatiles were removed by vacuum distillation. The resulting hydride-terminated silicone fluid was characterized by Brookfield viscosity measurements and $^1H$ and $^{29}Si$ NMR to accurately determine molecular weight.

The SiH fluid prepared above was then mixed with MQ resin, and the toluene was stripped to provide a solventless mixture containing 60% MQ resin and 40% SiH fluid.

EXAMPLES 8–14

Preparation of Pressure Sensitive Adhesives

Examples 8–14 illustrate the preparation of seven solventless pressure sensitive adhesives using the MQ resin/SiVinyl fluid mixtures and the MQ/SiH fluid mixture prepared in Examples 1–7 above.

Platinum catalyst (10 ppm of platinum) and 0.75% by weight of dimethylmaleate were added to the uncured PSA compositions, the dimethylmaleate being added to inhibit hydrosilation reactions at room temperature.

Seven pressure sensitive adhesives were prepared by the simple mixing of measured portions of the solventless MQ resin/SiVinyl fluids and MQ resin/SiH fluid described above such that the SiH/SiVinyl molar ratio was 1:1. Thin films having a thickness of about 1.5–2.0 mils of the uncured pressure sensitive adhesives were applied to 1.0 rail thick polyethylene terephthalate (PET) film with the use of a doctor blade. The resulting pressure sensitive adhesive was cured by heating to 130° C. for 8 minutes.

The tack of 1.5–2.0 mil thick films of the cured pressure sensitive adhesives on 1.0 mil thick PET were measured using a Polyken Probe Tack Tester, manufactured by testing Machine Incorporated, fitted with a 0.5 centimeter probe and operated at 1 cm/sec rate with a dwell time of 1 second. Peel adhesion was determined using an instron (Model 4202) fitted with a 10 pound load cell. Laminates of 1.5–2.0 mil thick films of the cured pressure sensitive adhesive on 1 rail thick PET were applied to stainless steel test panels using a 1 pound roller and allowed to stand for 20 minutes, then pulled at 180° C. at a rate of 12 inches per minute.

The crosslink densities, tack and peel adhesion properties of the cured pressure sensitive adhesives prepared in Examples 8–14 are shown in Table 2 below.

TABLE 2

Examples 8–14: Properties

| Example No. | Crosslink Density (%) | Tack (grams/cm$^2$) | Peel Adhesion (ounces/inch) |
| --- | --- | --- | --- |
| 8 | 0.28 | 840 | cohesive failure |
| 9 | 0.61 | 760 | 30 |
| 10 | 1.2 | 810 | 31 |
| 11 | 2.5 | less than 300 | 12 |
| 12 | 3.6 | less than 300 | transferred to steel |
| 13 | 6.8 | less than 300 | transferred to steel |
| 14 | 8.0 | less than 300 | transferred to steel |

The data shown in Table 2 above indicates that at SiH:SiVinyl molar ratios of 1:1, acceptable pressure sensitive adhesive properties are obtained at a crosslink density of between 0.3 and 2.0%. Higher crosslink densities for a 1:1 SiH:SiVinyl molar ratio result in dry adhesives (tack values of less than 300 grams/cm$^2$) which transfer to the steel test panel. Lower crosslink densities result in cohesive failure due to inadequate curing.

EXAMPLES 15–20

Six pressure sensitive adhesives having a solvent content of less than 0.5% were prepared by mixing the following solventless mixtures in the appropriate stochiometric ratios:

Part A:
  60 weight % MQ resin
  40 weight % $Vi(CH_3)_2Si[OSi(CH_3)_2]_{21.5}[OSiCH_3Vi]_{0.28}OSi(CH_3)_2Vi$ Part B:
  60 weight % MQ resin
  40 weight % $H(CH_3)_2Si[OSi(CH_3)_2]_{20.8}OSi(CH_3)_2H$ The combined crosslink density of the vinyl and hydride polymers above is about 0.67%. The combined viscosities of the vinyl and hydride polymers in these examples is from about 15 to about 20 centipoise at 25° C.

Pressure sensitive adhesives were prepared from these mixtures with Karstedt's catalyst containing 25 ppm of platinum metal and 0.75% dimethylmaleate as inhibitor. The compositions were cured on PET substrates for 3 minutes at 130° C. The tack and peel adhesion properties of the cured compositions were measured as a function of SiH/SiVinyl ratio according to the procedures described earlier herein and are presented in Table 3 below.

TABLE 3

Examples 15–20: Properties

| Example No. | SiH/SiVinyl Ratio | Tack (g/cm$^2$) | Peel Adhesion (oz/in) | Crosslink Density (%) |
| --- | --- | --- | --- | --- |
| 15 | 0.9:1 | 730 | 24 | 0.7 |
| 16 | 1.0:1 | 760 | 30 | 0.66 |
| 17 | 1.05:1 | 940 | 27 | 0.65 |
| 18 | 1.1:1 | 960 | 26 | 0.63 |
| 19 | 1.2:1 | 820 | 22 | 0.60 |
| 20 | 1.3:1 | 870 | 24 | 0.57 |

Examples 15–20 illustrate that good peel adhesion properties are obtained when the SiH/SiVinyl ratio is from 0.9 to 1.3, particularly at 1:1. Examples 15–20 further illustrate that the higher the SiH/SiVinyl ratio, the lower the crosslink density needed to achieve good pressure sensitive adhesive properties.

What is claimed is:

1. An organopolysiloxane composition curable to produce a pressure sensitive adhesive having high tack and peel adhesion, comprising by weight:

(A) from about 50 to about 75 parts by weight of a toluene soluble, resinous copolymer comprising $R_3SiO_{1/2}$ units and $SiO_{4/2}$ units wherein R is a monovalent hydrocarbon radical having from 1 to about 6 carbon atoms, the resinous copolymer comprising from about 0.2% to about 5.0% by weight, based on the total weight of the copolymer, of hydroxyl radicals, at least 95% of all R groups being alkyl group, the total number of R radicals that are alkenyl radicals being 0–0.5% of all R radicals, the molar ratio of $R_3SiO_{1/2}$ units to $SiO_{4/2}$ units being from 0.6 to about 0.9 inclusive;

(B) an alkenyl-terminated polydiorganosiloxane having the general formula $$R^2R^1_2SiO(R^1_2SiO)_m(R^2R^1SiO)_nSiR^1_2R^2 \qquad (I)$$

wherein each $R^1$ is independently an alkyl group having from to about 10 carbon atoms or an aryl group, $R^2$ is an alkenyl group having from 1 to about 10 carbon atoms, "m" and "n" are numbers such that the sum of "m"+"n" is equal to number in the range of from about 1 to about 300;

(C) an organohydrogenpolysiloxane compatible with the mixture of (A) and (B) and having the general formula $$R^3_2HSiO(R^3HSiO)_a(R^3_2SiO)_bSiHR^3_2 \qquad (II)$$

wherein each $R^3$ is independently an alkyl group having from 1 to about 10 carbon atoms or an aryl group, "a" and "b" each are numbers such that the sum of "a"+"b" is a number in the range of from 1 to about 300, there being greater than two silicon-bonded hydrogen atoms per molecule of (C), no silicon atom bearing more than one silicon bonded hydrogen atom; the total of (B) and (C) being from about 25 to about 50 parts by weight; the total (A(, (B), and (C) being 100 parts by weight; the molar ratio of silicon-bonded hydrogen groups in (C) to silicon-bonded alkenyl groups in (B) being in the range of from about 0.8:1 to about 1.5:1; with proviso that the total crosslink density of (B) and (C) is from about 3.0 to about 5.0%, and with the further proviso that the combined viscosities of (B) and (C) are from about 15 to about 25 centipoises at 25° C.;

(D) a catalytic amount of a hydrosilation catalyst; and (E) from 0 to about 10% by weight of an organic solvent.

2. A composition according to claim 1 wherein from about 0 to about 0.5% by weight of the organic solvent (E) is present.

3. A composition according to claim 2 wherein 0% by weight of the organic solvent (E) is present.

4. A composition according to claim 1 wherein the combined crosslink density of (B) and (C) is from about 0.3 to about 2.0% and the molar ratio of silicon-bonded hydrogen groups in (C) to silicon-bonded alkenyl groups in (B) is about 1:1.

5. A composition according to claim 4 wherein the combined crosslink density of (B) and (C) is from about 0.40 to about 1.5%.

6. A composition according to claim 5 wherein the combined crosslink density of (B) and (C) is from about 0.60 to about 1.2%.

7. A composition according to claim 1 wherein the molar ratio of silicon-bonded hydrogen groups in (C) to silicon-bonded alkenyl groups in (B) is in the range of from about 0.9:1 to about 1.3:1.

8. A composition according to claim 7 wherein the molar ratio of silicon-bonded hydrogen groups in (C) to silicon-bonded alkenyl groups in (B) is about 1:1.

9. A composition according to claim 1 wherein the resinous copolymer (A) comprises from about 1.0% to about 3.0% by weight, based on the total weight of the copolymer, of hydroxyl radicals.

10. A composition according to claim 1 wherein (A) is present in the amount of from about 50 to about 70 parts by weight.

11. A composition according to claim 10 wherein (A) is present in the amount of from about 55 to about 62 parts by weight.

12. A composition according to claim 1 wherein the total amount of (B) and (C) is from about 30 to about 50 parts by weight.

13. A composition according to claim 12 wherein the total amount of (B) and (C) is from about 38 to about 45 parts by weight.

14. A composition according to claim 1 wherein the hydrosilation catalyst is a platinum-containing hydrosilation catalyst.

15. A composition according to claim 1 wherein the platinum-containing hydrosilation catalyst is present in an amount of at least 1.0 part by weight per 1 million pans of the total of (A), (B), and (C).

16. A composition according to claim 1 further comprising an inhibitor for the hydrosilation catalyst.

17. A composition according to claim 16 wherein the inhibitor is a dialkylmaleate.

18. A composition according to claim 1 wherein R, $R^1$, and $R^3$ are each methyl.

19. A composition according to claim 1 wherein $R^2$ is a vinyl group.

20. The cured composition of claim 1.

21. An article of manufacture comprising a solid support carrying on at least one surface thereof the curable composition of claim 1.

22. An article of manufacture comprising a solid support carrying on at least one surface thereof the cured composition of claim 1.

23. A pressure sensitive adhesive tape comprising a flexible support carrying on at least one surface thereof the curable composition of claim 1.

24. A pressure sensitive adhesive tape according to claim 23 wherein the flexible support is an impregnated glass cloth, a polyester polymer, a polyimide polymer, or a chemically treated fluorocarbon polymer support.

25. A pressure sensitive adhesive tape comprising a flexible support carrying on at least one surface thereof the cured composition of claim 1.

26. A pressure sensitive adhesive tape according to claim 25 wherein the flexible support is an impregnated glass cloth, a polyester polymer, a polyimide polymer, or a chemically treated fluorocarbon polymer support.

27. A solventless organopolysiloxane composition curable to produce a pressure sensitive adhesive having high tack and high peel adhesion, comprising by weight:

(A) from about 50 to about 75 parts by weight of a toluene soluble, resinous copolymer comprising $R^3SiO_{1/2}$ units and $SiO_{4/2}$ units wherein R is a monovalent hydrocarbon radical having from 1 to about 6 carbon atoms, the resinous copolymer comprising from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{1/2}$ units to $SiO_{4/2}$ units being from about 0.6 to about 0,9 inclusive;

(B) an alkenyl-terminated polydiorgansiloxane having the general formula $$R^2R^1_2SiO(R^1_2SiO)_m(R^2R^1SiO)_nSiR^1_2R^2 \qquad (I)$$

wherein each $R^1$ is independently an alkyl group having from 1 to about 10 carbon atoms or an aryl group, $R^2$ is an alkenyl group having from 1 to about 10 carbon atoms, "m" and "n" are numbers such that the sum of "m"+"n" is equal to a number in the range of from about 1 to 300;

(C) an organohydrogenpolysiloxane compatible with the mixture of (A) and (B) and having the general formula $$R^3_2HSiO(R^3HSiO)_a(R^3_2SiO)_bSiHR^3_2 \quad (II)$$

wherein each $R^3$ is independently an alkyl group having 1 to about 10 carbon atoms or an aryl group, "a" and "b" each are numbers such that the sum of "a"+"b" is a number in the range of from 1 to about 300, there being greater than two silicon bonded hydrogen atoms per molecule of (C), no silicon atom bearing from about 25 to about 50 parts by weight; the total of (A),(B), and (C) being 100 parts by weight; the molar ratio of silicon-bonded hydrogen groups in (C) to silicon-bonded alkenyl groups in (B) in the range of from about 0.8:1 to about 1.5:1; with the proviso that the total crosslink density of (B) and (C) is from about 3.0 to about 5.0%, and with the further proviso that the combined viscosities of (B) and (C) are from about 15 to about 25 centipoises at 25° C.; and (D) a catalytic amount of a hydrosilation catalyst.

28. The cured composition of claim 27.

29. An article of manufacture comprising a solid support carrying on at least one surface thereof the curable composition of claim 27.

30. An article of manufacture comprising a solid support carrying on at least one surface thereof the cured composition of claim 27.

31. A pressure sensitive adhesive tape comprising a flexible support carrying on at least one surface thereof the curable composition of claim 27.

32. A pressure sensitive adhesive tape according to claim 31 wherein the flexible support is an impregnated glass cloth, a polyester polymer, a polyimide polymer, or a chemically treated fluorocarbon polymer support.

33. A pressure sensitive adhesive tape comprising a flexible support carrying on at least one surface thereof the cured composition of claim 27.

34. A pressure sensitive adhesive tape according to claim 33 wherein the flexible support is an impregnated glass cloth, a polyester polymer, a polyimide polymer, or a chemically treated fluorocarbon polymer support.

* * * * *

UNITED STATES PATENT AND TRADEMARK OFFICE
CERTIFICATE OF CORRECTION

PATENT NO. : 5,466,532
DATED : November 14, 1995
INVENTOR(S) : Jeffrey H. Wengrovius, Timothy B. Burnell,
Virginia M. Van Valkenburgh It is certified that error appears in the above-indentified patent and that said Letters Patent is hereby corrected as shown below:

On the title page, item [73], Assignee is missing. Please add
--General Electric Company, Waterford, NY. --.

Signed and Sealed this

Sixth Day of August, 1996

Attest:

BRUCE LEHMAN

Attesting Officer

Commissioner of Patents and Trademarks